United States Patent [19]

Silverberg

[11] Patent Number: 5,307,082
[45] Date of Patent: Apr. 26, 1994

[54] ELECTROSTATICALLY SHAPED MEMBRANES

[75] Inventor: Larry M. Silverberg, Raleigh, N.C.

[73] Assignee: North Carolina State University, Raleigh, N.C.

[21] Appl. No.: 968,050

[22] Filed: Oct. 28, 1992

[51] Int. Cl.$^5$ .................... H01Q 15/20; G02B 7/18
[52] U.S. Cl. .................... 343/915; 359/847; 359/849
[58] Field of Search .............. 343/757, 912, 915; 359/846, 849, 291, 292, 295; 310/308, 309; H01Q 15/00, 15/14, 15/16, 15/20

[56] References Cited

U.S. PATENT DOCUMENTS

| | | |
|---|---|---|
| 3,389,226 | 6/1968 | Peabody. |
| 3,629,624 | 12/1971 | Staudte ................... 310/6 |
| 3,735,035 | 5/1973 | Kowalski et al. ........... 178/7.1 |
| 3,800,102 | 3/1974 | Janszen ................. 179/111 |
| 3,886,310 | 5/1975 | Guldberg et al. ............ 178/7.5 |
| 3,924,228 | 12/1975 | Goodrich ................. 340/336 |
| 3,935,397 | 1/1976 | West ..................... 179/111 |
| 4,006,311 | 2/1977 | Carlsson ................. 179/1 |
| 4,093,351 | 6/1978 | Perkins et al. ........... 359/847 |
| 4,105,877 | 8/1978 | Peters ................... 179/111 |
| 4,203,128 | 5/1980 | Guckel et al. ............ 357/60 |
| 4,309,368 | 1/1982 | Groves ................... 264/22 |
| 4,356,730 | 11/1982 | Cade ..................... 73/517 |
| 4,419,545 | 12/1983 | Kuindersma .............. 179/111 |
| 4,475,323 | 10/1984 | Schwartzberg et al. ...... 343/915 |
| 4,534,918 | 8/1985 | Forrest, Jr. ............. 264/22 |
| 4,571,594 | 2/1986 | Haupt .................... 343/840 |
| 4,684,954 | 8/1987 | Sureau et al. ............ 343/909 |
| 4,689,186 | 8/1987 | Bornat ................... 264/6 |
| 4,790,021 | 12/1988 | Pribyl ................... 381/191 |
| 4,810,180 | 3/1989 | Isner .................... 425/174 |
| 4,875,765 | 10/1989 | Vandenberg et al. ........ 350/611 |
| 4,909,611 | 3/1990 | Spooner .................. 359/291 |
| 4,924,503 | 5/1990 | Klein .................... 381/190 |
| 4,993,823 | 2/1991 | Schaffer, Jr. et al. ..... 350/611 |
| 5,001,381 | 3/1991 | Watanabe ................. 310/309 |

FOREIGN PATENT DOCUMENTS 2128733 5/1984 United Kingdom ............ 359/846

OTHER PUBLICATIONS

Research Proposal to US Army Research Office, (1992).
A Proposal To The National Science Foundation (1992).
Proposal Submitted to Air Force Office of Scientific Research (1992).
J. H. Lang, *NASA Conf. Pub. 2269* 575–582 (1982).
Jeffrey H. Lang et al. *IEEE Transactions on Automatic Control AC-27*, 666–670 (1982).

*Primary Examiner*—Donald Hajec
*Assistant Examiner*—Tan Ho
*Attorney, Agent, or Firm*—Bell, Seltzer, Park & Gibson

[57] ABSTRACT

Disclosed is a method and apparatus for electrostatically shaping a membrane suitable for use in antennas or the like, comprising an electrically conductive thin membrane where the periphery of said membrane is free to move in at least one direction, a first charge on the electrically conductive thin membrane to electrostatically stiffen the membrane, a second charge which shapes the electrostatically stiffened thin membrane and a restraint for limiting the movement of at least one point of the thin membrane relative to the second charge. Also disclosed is a method and apparatus for adaptively controlling the shape of the thin membrane by sensing the shape of the membrane and selectively controlling the first and second charge to achieve a desired performance characteristic of the membrane.

20 Claims, 9 Drawing Sheets

ELECTROSTATICALLY SHAPED MEMBRANES

This invention was made with government support under grant number NAG1-977 from NASA. The government has certain rights in this invention.

FIELD OF THE INVENTION

The present invention relates to the shaping of thin membranes through the use of electrostatic forces. More particularly, the present invention relates to the shaping of thin membranes for use as antennas in space vehicles, including satellites.

BACKGROUND OF THE INVENTION

Aerospace applications that require precise surface shapes for pointing or focusing signals are widespread. In satellite communications, microwave antennas require smooth surfaces of certain geometric shapes for long distance information transmissions. Although these surfaces can be manufactured on earth with precise tolerances, in space, such environmental hazards as large thermal gradients and space debris cause unacceptable surface distortions. From a mechanical viewpoint, today's space-based antennas are fixed-shape structures that deploy. Among the antenna's performance objectives, the most significant are that small thermally induced deformations be maintained, that the system mass be minimal and that the antenna be deployed reliably. Toward that end, low density, high strength, low coefficient of expansion materials are selected, shrouds reduce thermal gradients, and configurations are optimized to reduce deformations. Still, the inherent trade-offs between low mass and small deformations in a thermally varying environment limit the performances achieved. Also, mechanical deployment mechanisms continue to suffer in their performance. This is due to the trade off between the desire to minimize clearances to reduce slop, and the desire to maximize clearances to reduce the chance of contact surface sticktion. (See "1.4 Billion Dollar Galileo Mission Appears Crippled", Washington Post, Dec. 18, 1991).

Previous attempts to develop antenna reflectors using electrostatics involved suspending an electrically conductive material in a support structure. See for example U.S. Pat. No. 4,093,351 and U.S. Pat. No. 4,571,594. The support structure of these antennas defined the shape of the periphery of the antenna and the material was then electrostatically tensioned against this structure. These efforts exhibited the same limitations as mechanically shaped antennas in the thermally varying space environment in that the relative size of the tension forces quickly overcame the electrostatic forces to limit the ability to shape the conductive material. Furthermore, these efforts were limited in that the support structure must be moved to retarget the antenna and any changes in the swath of the antenna are limited.

Indeed, the varying shape capability of electrostatically shaped membranes is greatly expanded when the limitations of an external supporting structure are removed and when the characteristics of an antenna employing the teachings of the present invention are employed. The expanded capability allows the antenna to transmit and to receive information from ground swaths that vary in size, to retarget, to refocus, to vary focal length and to rapidly scan.

It is, therefore, one objective of the present invention to provide an electrostatically shaped membrane suitable for use in space-based electrostatic antennas, capable of varying its shape and electrostatic deployment unlike present fixed shape mechanically deployed antennas.

It is a further objective of the present invention to provide an ultra low weight antenna by providing an electrostatically shaped membrane which may be retargeted, refocused, the ground swath varied or scanned rapidly without disturbing the satellite dynamics.

It is an additional objective of the present invention to provide an electrostatically shaped membrane suitable for electrostatic deployment which does not suffer from the inherent trade-offs that limit the performance of mechanical mechanisms. Increased reliability in deployment enables deployment and retractment to be carried out repeatedly and thereby allows for a stowed antenna which is protectable from such environmental hazards as high dose radiation exposure, space debris and destructive interception.

It is another objective of the present invention, and one of particular practical value, to provide an electrostatically shaped membrane for use in an antenna which may serve as a multifunction system replacing functions otherwise carried out separately by as many as five or more antennas.

SUMMARY OF THE INVENTION

The present invention provides a method and apparatus for producing an electrostatically shaped membrane comprising an electrically conductive thin membrane where the periphery of the membrane is free to move in at least one direction, producing an electrical charge on the electrically conductive thin membrane to electrostatically stiffen the membrane and producing a second electrical charge which shapes the electrostatically stiffened thin membrane. The electrostatically shaped membrane is physically restrained with respect to the second charge to limit the movement of at least one point of the thin membrane relative to the second charge. A further aspect provides adaptive shaping of the thin membrane by providing sensors operably associated with the membrane for detecting the shape of said membrane and control means responsive to the sensors to control the charges to shape the membrane to produce a preselected performance characteristic of the thin membrane.

A further aspect of the present invention is to provide an electrostatically shaped satellite antenna comprising, an electrically conductive thin membrane where the periphery of the membrane is free to move in at least one direction, a first charge on the electrically conductive thin membrane to electrostatically stiffen the membrane, a second charge which shapes the electrostatically stiffened thin membrane, a restraint for limiting the movement of at least one point of the thin membrane relative to the second charge, sensors operably associated with the membrane for sensing the shape of the membrane, means for selectively controlling the first and second charge to shape the membrane to produce a preselected performance characteristic in the thin membrane, and means for deploying and retracting the thin membrane.

DETAILED DESCRIPTION OF THE PREFERRED EMBODIMENTS

The electrostatic antenna of the present invention differs from today's antennas in a fundamental way. The shape of the antenna surface, rather than being maintained mechanically, is controlled electrostatically, and the deployment of the antenna is carried out electrostatically rather than by mechanical means.

Electrostatic membrane technology represents an ability to distribute electrical charge on the surface of membrane-type structures and through a surrounding electrostatic field to control the membrane dynamics. The electrostatic force is naturally well suited for the task of controlling membrane dynamics. Spatially, the electrostatic force naturally distributes itself over the membrane surface. Temporally, the time constants associated with charged particle motion are minuscule compared to the time constants associated with the membrane dynamics, so the charged particle motion and the membrane dynamics are uncoupled. Through a surrounding electrostatic field, this uncoupling enables the electrostatic force on the membrane surface to be used to artificially stiffen the membrane, to provide artificial damping, to provide shape control, and to control its deployment and retractment.

The present invention will now be described in more detail with reference to the drawings. As used herein the term "electrostatically stiffened" shall be used to describe the condition where the electrostatic forces acting on an electrically conductive membrane are greater than the mechanical stiffness of the membrane such that when a static charge is applied to the membrane the membrane stiffens. This concept is illustrated in FIGS. 1A and 1B.

Figure 1A:
FIG. 1A is a schematic representation of a thin electrically conductive membrane before an electrostatic charge is applied.
Figure 1B:
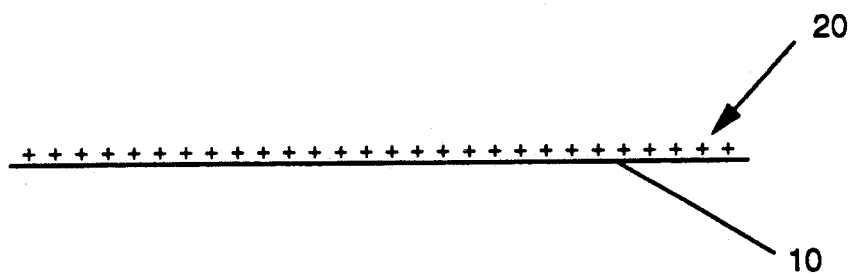
FIG. 1B is a schematic representation of a thin electrically conductive membrane after an electrostatic charge is applied.

FIG. 1A shows a thin, flexible, electrically conductive membrane 10 in free space. It can have an irregular shape or very low fundamental frequency of oscillation when a voltage is not applied to the membrane. FIG. 1B shows the results of applying a voltage to the membrane 10 to produce a charge distribution 20 on the membrane. When a voltage is applied to the membrane 10 the charge 20 which develops on the membrane distributes throughout the membrane in the manner dictated by the repulsive force of adjacent charges. If sufficient to overcome the mechanical stiffness of the membrane 10, the repulsive forces of the charge distributed throughout the membrane cause the membrane to stiffen. As will be appreciated by one of skill in this art, the application of a charge to the membrane substantially increases the fundamental frequency of oscillation of the membrane. Thus, the membrane electrostatically stiffens.

Figure 1C:
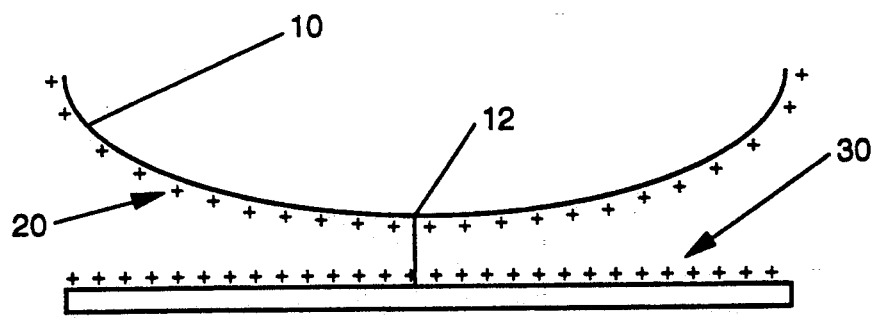
FIG. 1C is a schematic representation of a thin electrically conductive membrane after an electrostatic charge is applied which is shaped by an external charge.

As shown in FIG. 1C, once stiffened through electrostatic forces, the membrane 10 may be shaped using an external charge 30. The external charge causes an external force to be exerted on the membrane which shapes the membrane. As shown in FIG. 1C, the movement of the membrane 10 is restrained at least at one point 12 with respect to the external charge 30. By varying the distribution and intensity of the external charge 30, the shape of the membrane 10 may be accurately controlled.

Figure 2:
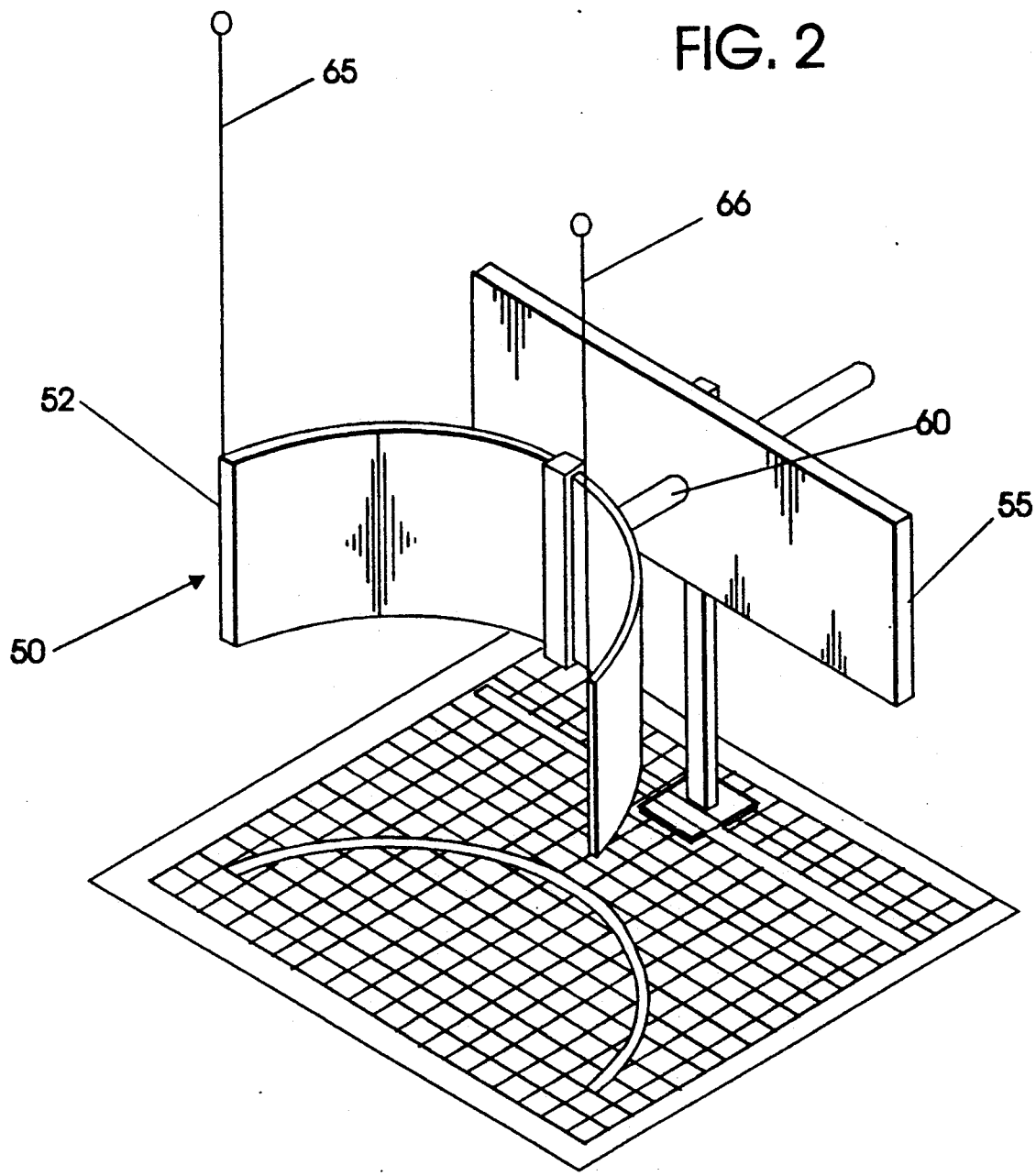
FIG. 2 is a pictorial representation of an electrostatically shaped thin membrane according to the present invention.
Figure 3:
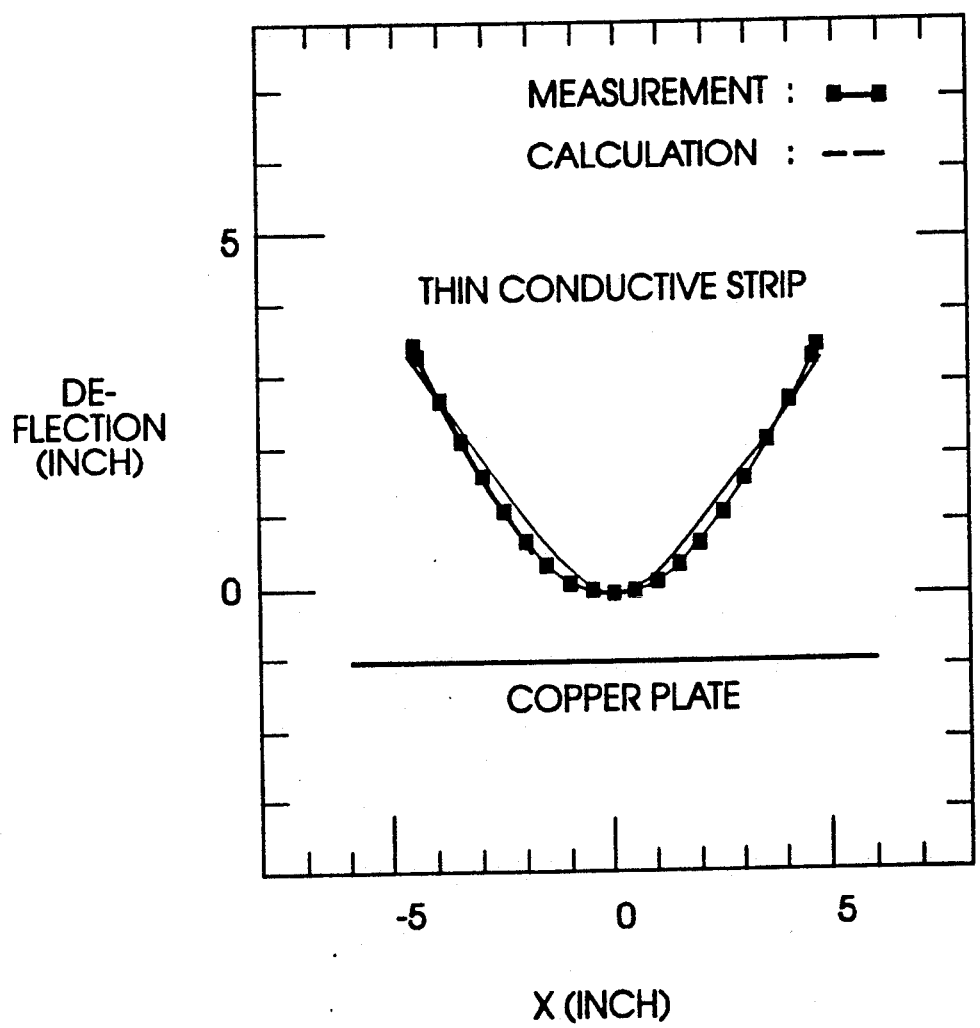
FIG. 3 is a graphic representation of the actual displacement of an electrostatically shaped membrane as compared to the displacement predicted by a theoretical model.

The electrostatically shaped membrane shown in FIG. 2 was produced in the following progression: A 78.5"×19.5"×29.5" protective chamber (not shown) was first fabricated in order to protect the investigators from high voltages. The chamber was designed so that electrostatic structures and related concepts could be tested with ease and within a short duration. A 2.5 in.×12 in. conductive fabric was suspended in the protective chamber and a 3 in.×12 in. metal plate was fixed 1 in. away from the membrane. The membrane consisted of a 100% polyester non-woven interfacing sheet coated with Aquadag-E for conductivity. The measured elastic modulus of the membrane was $0.425 \times 10^{-6}$ kg$_-$m$^3$/sec. The membrane 50 was held in position by the restraining bracket 60 which restrains the center point of the membrane with respect to the back-plate 55 when the membrane was being electrostatically shaped. The periphery 52 of the thin membrane 50 was free to move in two directions (in the plane of the figure), and only constrained not to move in the one direction of gravity. The force of gravity was counteracted at the ends of the membrane 50 by the strings 65 and 66. These strings allowed movement in two horizontal directions and constrained movement in the direction of gravity. The membrane and back plate were connected to a regulated voltage source providing the voltage $V_r$. Upon applying $V_r$, the membrane underwent a large deformation and charge distributed itself over the membrane and back-plate. The predicted shape of the membrane was compared with the experiment, as shown in FIG. 3. As shown, the deformations obtained experimentally agree with the predictions to within the tolerance of the measurement system.

Suitable control over the shape of the membrane for use as an antenna reflector is achieved if the tip deflection error is 10 times smaller than the transmitting-/receiving signal wavelength. It follows that, an electrostatically shaped membrane can accommodate 30 GHz frequencies if the tip displacement in the previously described system is prescribed with an accuracy of 1 mm. From Table 1, 1 mm tip displacement errors correspond to 160 V changes in the applied voltages. It follows that the voltages must be applied with an accuracy of 160 V.

TABLE 1

| Voltage resolution vs tip displacements | |
|---|---|
| Voltage (KV) | d (mm) |
| 3 | 60.96 |
| 4 | 71.12 |
| 5 | 80.01 |
| 6 | 88.9 |
| 7 | 96.52 |
| 8 | 101.6 |
| 9 | 105.41 |

Figure 4:
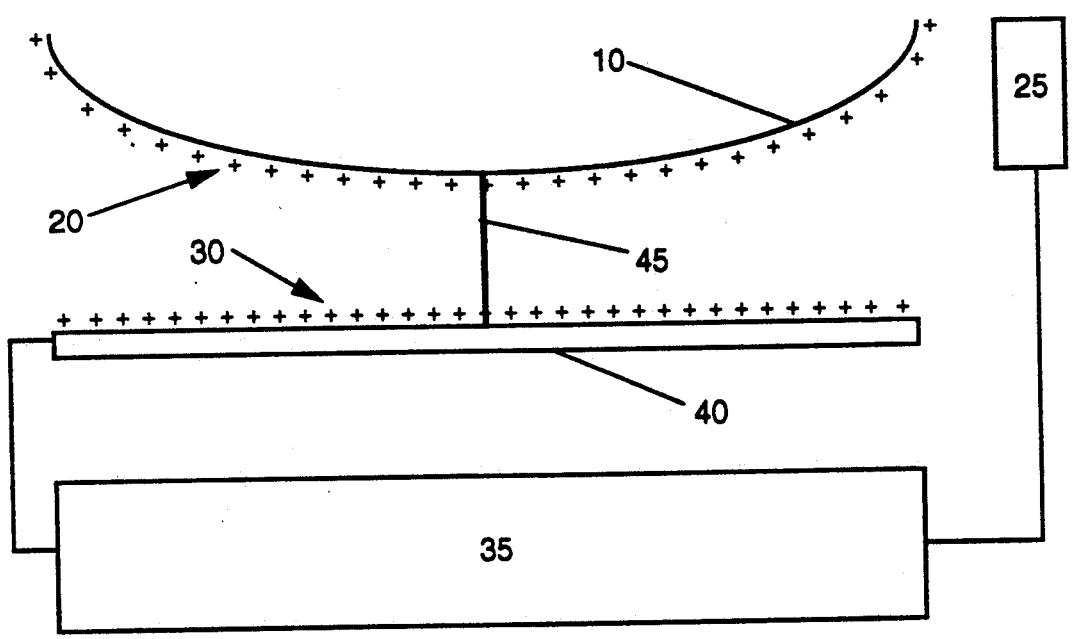
FIG. 4 is a schematic representation of an electrostatically shaped thin membrane using an external conducting element to shape the thin membrane.

FIG. 4 schematically illustrates the present invention utilizing an external element 40 to control the shape of an electrically conductive membrane 10. As illustrated in FIG. 4, the external element may comprise an electrically conductive back-plate or the like. A static charge is carried to the membrane 10 throuqh an electrical interface 45. The electrical interface may be flexible to further allow for retraction of the membrane. The electrical interface may be a conductive string or tether or other such devices known to one of skill in this art for electrically connecting the membrane to a source of charge. Furthermore, the electrical interface may optionally serve as a restraint to restrict the movement of the membrane relative to the external element. The first charge 20 electrostatically stiffens the conductive membrane. A second, external charge 30 is placed on the external element 40. This external charge 30 shapes the conductive membrane to create the desired shape. A positive charge is preferably formed on the membrane and the back plate by applying a positive voltage to the external element and the membrane. However, as one of skill in this art will appreciate, other means of producing a first charge on the membrane and a second, external charge on the external element will also be suitable for carrying out the present invention.

Variations in shape may also be achieved through dividing the membrane or the external element or both into a plurality of electrically isolated elements and then applying various voltages to selected elements to achieve the desired shape. While providing an electrical connection to the membrane 10 the electrical interface 45 may also serve to retain the position of at least one point of the membrane 10 with respect to the external element 40 such that the force of the respective charges do not cause the membrane 10 to be displaced beyond the effective electrostatic range of the external element 40. The effective electrostatic range of the external element is defined as that area in space in which the external element is capable of electrostatically shaping the membrane into the desired shape. Therefore, the restraint 45 acts as an electrical interface and maintains the position of the membrane 10 in a position in space where the external element 40 may shape the membrane. While a tether has been illustrated as a means to restrain the membrane, other suitable means for limiting the movement of at least one point of the membrane relative to the shaping charge known to one of skill in this art may be utilized.

In addition to the electrostatic membrane and shaping apparatus shown in FIG. 4, also shown is a shape sensor 2$ and charge control circuitry 35. These components combine with the external element 40 and the membrane 10 to provide a feedback mechanism through which the shape of the membrane may be controlled. The shape sensor 25 senses the shape of the membrane 10 and relays that information to the charge control circuitry 35. This shape information is then compared with the desired shape of the membrane and the appropriate voltages are manipulated in the external element or the membrane to achieve the desired shape of the membrane. Apparatus for sensing the shape of the membrane and controlling the charge on the external element and/or the membrane are known to one of skill in the art. Examples of methods and apparatus for detecting the shape of the membrane include figure sensors and other shape sensing mechanisms known to one of skill in this art. The information from the sensor may be processed to determine the correlation between the actual and desired shapes of the membrane and appropriate control signals produced to correct for any miscorrelation on digital computers and signal processors known to one of skill in the art. The charge on the external element and/or the membrane may be manipulated by manipulating the voltages of the external element or the membrane. Through the use of the sensor 25 and the charge control circuitry 35 a control feedback loop is produced which allows for the correction of errors in the shape of the membrane caused by thermal stress, space debris or other hazards. As will be recognized by one of skill in this art, other means of adaptive shape control may be utilized to achieve the benefits of the present invention. These methods include, for example, indirectly sensing the shape of the antenna by monitoring the performance characteristics of an antenna and then correcting the shape to achieve the desired performance characteristics.

The membrane may be deployed or retracted from a protective enclosure by manipulating the charge on the external element and/or on the membrane. By placing the appropriate charge on either the membrane or the external element appropriate forces may be employed to deploy the membrane and then further manipulation of the relative charges on either the external element and/or the membrane appropriate forces may be produced to retract the membrane. As will be apparent to one of skill in this art, the use of external elements other than those used to shape the membrane may be beneficial for deployment and/or retraction of the membrane.

Figure 5A:
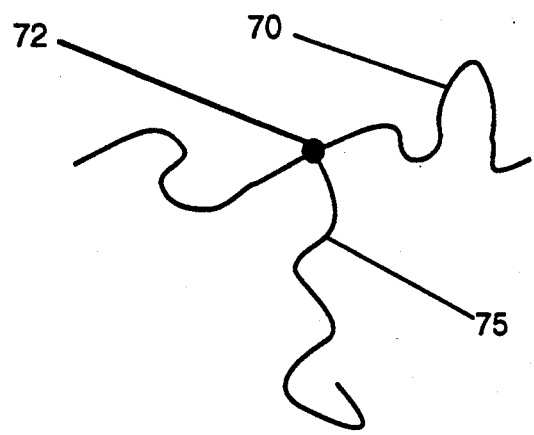
FIGS. 5A is a schematic representation of one of a plurality of electrically isolated elements of an electrostatically shaped thin membrane comprised of a plurality of electrically isolated elements shaped by an electrically conductive element before a charge is applied.
Figure 5B:
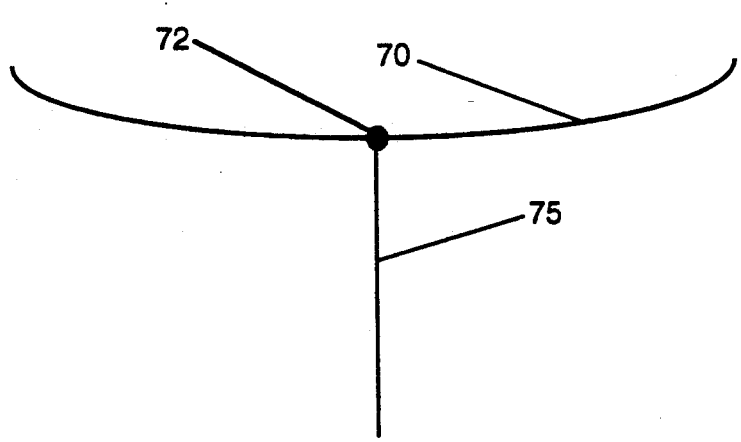
FIGS. 5B is a schematic representation of one of a plurality of electrically isolated elements of an electrostatically shaped thin membrane comprised of a plurality of electrically isolated elements shaped by an electrically conductive element after a charge is applied.

In an alternate embodiment of the present invention, the use of separate external elements may be eliminated and the membrane may be shaped through the use of a plurality of electrically isolated sections having attached external elements such that a "Y" shaped section is formed. One of these "Y" shaped sections of the membrane is shown in FIG. 5A. As seen in FIG. 5A, a thin, flexible, electrically conductive section 70 is illustrated before a voltage is applied to the membrane. The section is provided with an electrically conductive attached external element 75 which allows a charge distribution to form on the section and the external element when a voltage is applied to the external element. The conductive section 70 is restrained with respect to the external element 75 at point 72. FIG. 5B shows the results of applying a voltage to the section 70 through the attached external element 75 to produce a charge distribution on the section and the external element. When a voltage is applied to the section 70 the charge which develops on the section distributes throughout the section in the manner dictated by the repulsive force of adjacent charges. If sufficient to overcome the mechanical stiffness of the section 70, the repulsive forces of the charge distributed throughout the section cause the section to stiffen. Thus, the section electrostatically stiffens. As seen in FIGS. 5A and 5B, a flat sheet of electrically conductive thin section will flatten and an electrically conductive external element will form a "y" arrangement about the point 72 where the section 70 is attached to the external element 75 when a voltage is applied to the membrane and the external element. The angle between the external element and the section may then be controlled by the voltage applied to the external element. As with the section, the external element 75 is preferably capable of electrostatic stiffening such that the electrostatic forces on the external element overcome the mechanical stiffness of the external element.

Figure 5C:
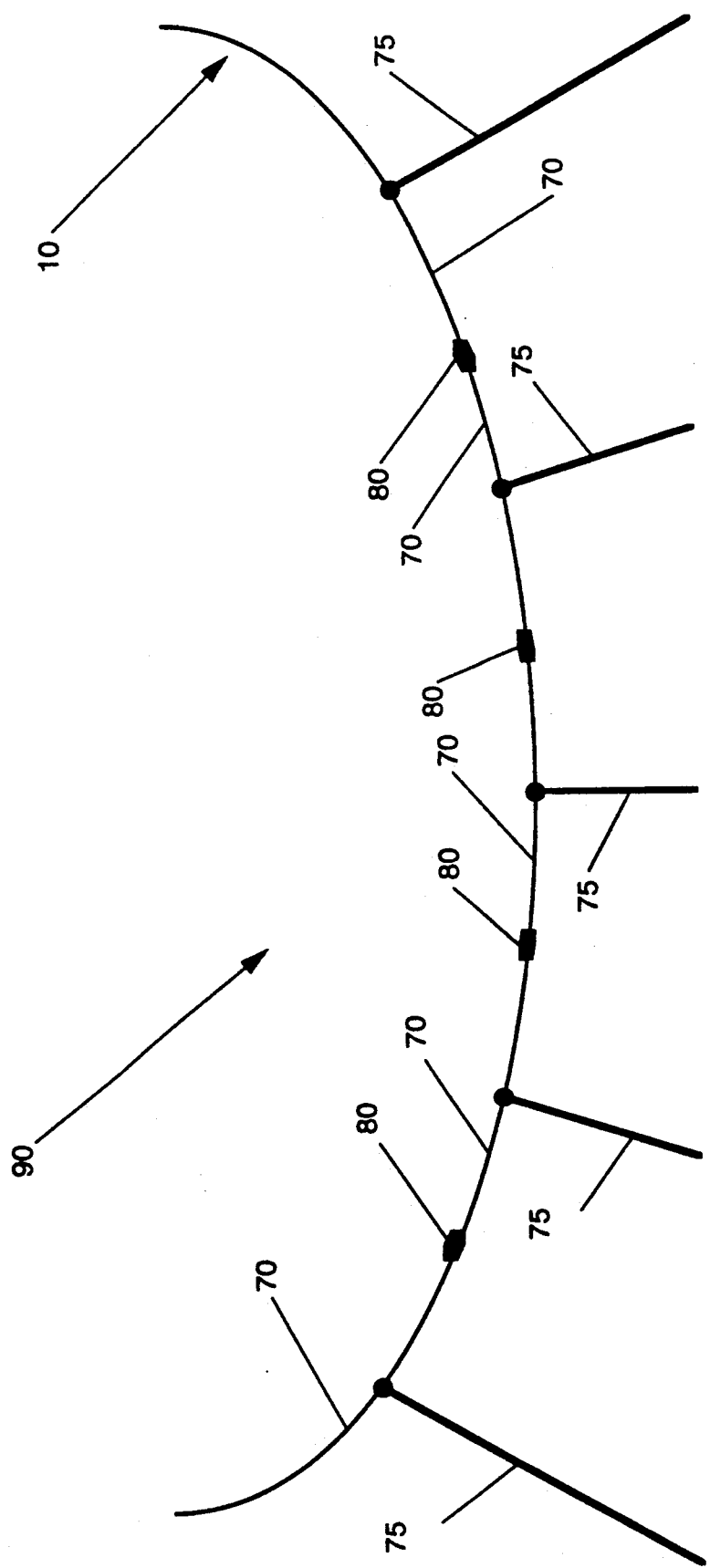
FIGS. 5C is a schematic representation of an electrostatically shaped thin membrane comprised of a plurality of electrically isolated elements shaped by an electrically conductive element after a charge is applied to each of the plurality of sections.

As shown in FIG. 5C, once stiffened through electrostatic forces, the complete membrane 90 may be formed through electrostatically shaping a plurality of sections 70. These sections are electrically insulated by non-conducting material 80 such that an independent voltage may be applied to each section. Voltages may be applied to individual sections of the membrane 90 through the individual external elements 75 or other means known to one of skill in the art. These external elements may also act to restrain the sections into the effective electrostatic range of the charge on the external elements, thereby maintaining the overall position of the membrane. The effective electrostatic range of the external elements is that area in space where the membrane may be shaped by the electrostatic forces of the external elements. By varying the distribution and intensity of the voltages applied to various sections of the membrane 90 the shape of the membrane may be established. As will be apparent to one of skill in the art from the above discussion, through the use of feedback control circuitry the shape of the membrane 90 may be controlled to compensate for various environmental changes or to control the electrical characteristics of the membrane. Furthermore, the membrane may be deployed or retracted through manipulation of the charge as described above.

As described herein, elements of the present invention have been described as separate physical structures, however, various functions of these elements may be combined into single structures while still obtaining the advantages of the teachings of the present invention. For example, the restraint and electrical interface may be separate or a single structure. Furthermore, as will be understood by one of skill in this art, methods other than those described herein of positioning a second electrical charge so as to shape the electrostatically stiffened membrane may be utilized in practicing the present invention. Thus, the density of charge distribution or the position of a charge distribution may be manipulated to achieve a desired shape for a given electrostatically stiffened membrane.

Figure 6A:
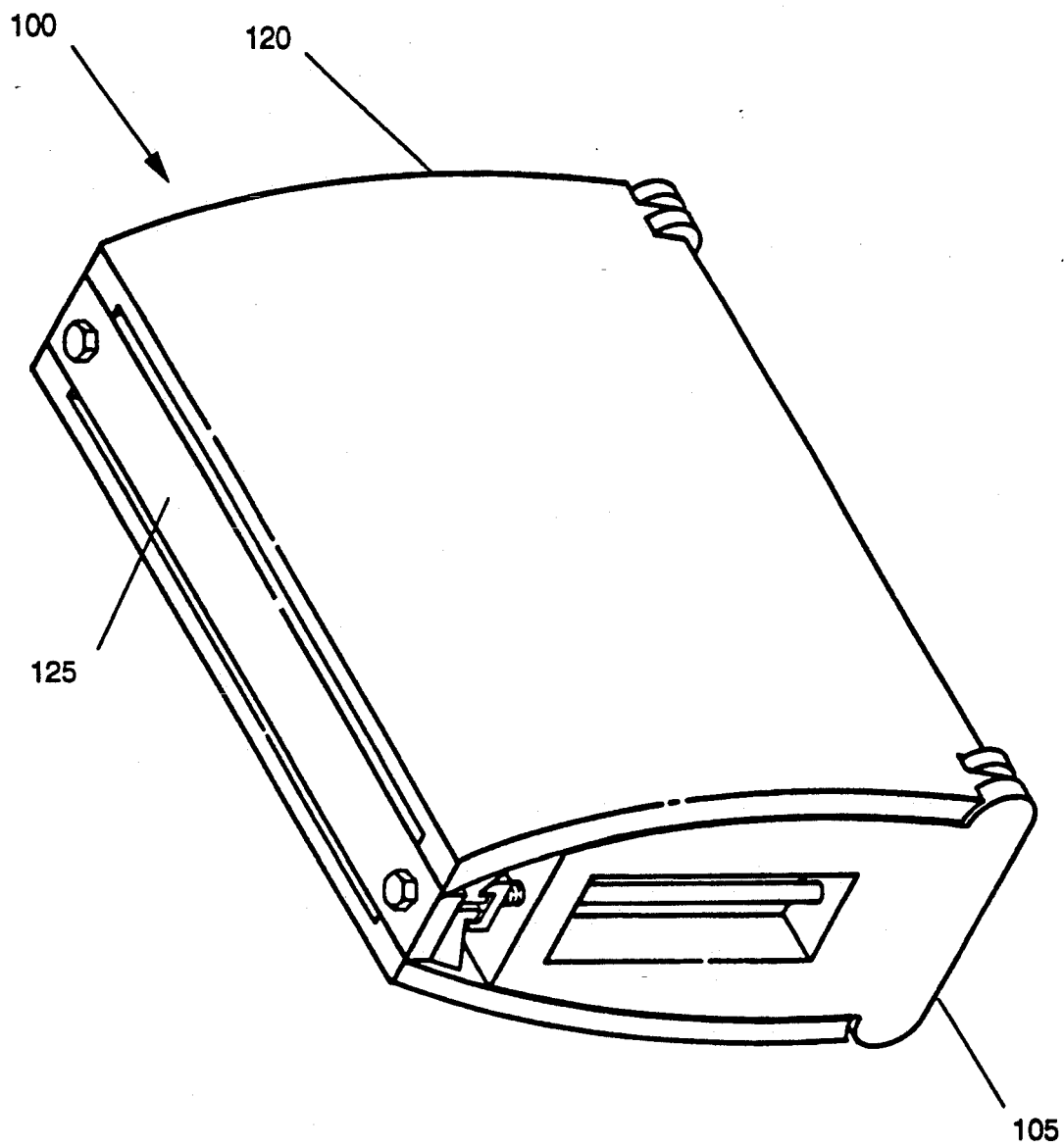
FIG. 6A is a pictorial representation of a first embodiment of the present invention as a parabolic antenna using a line feed in the retracted position.
Figure 6B:
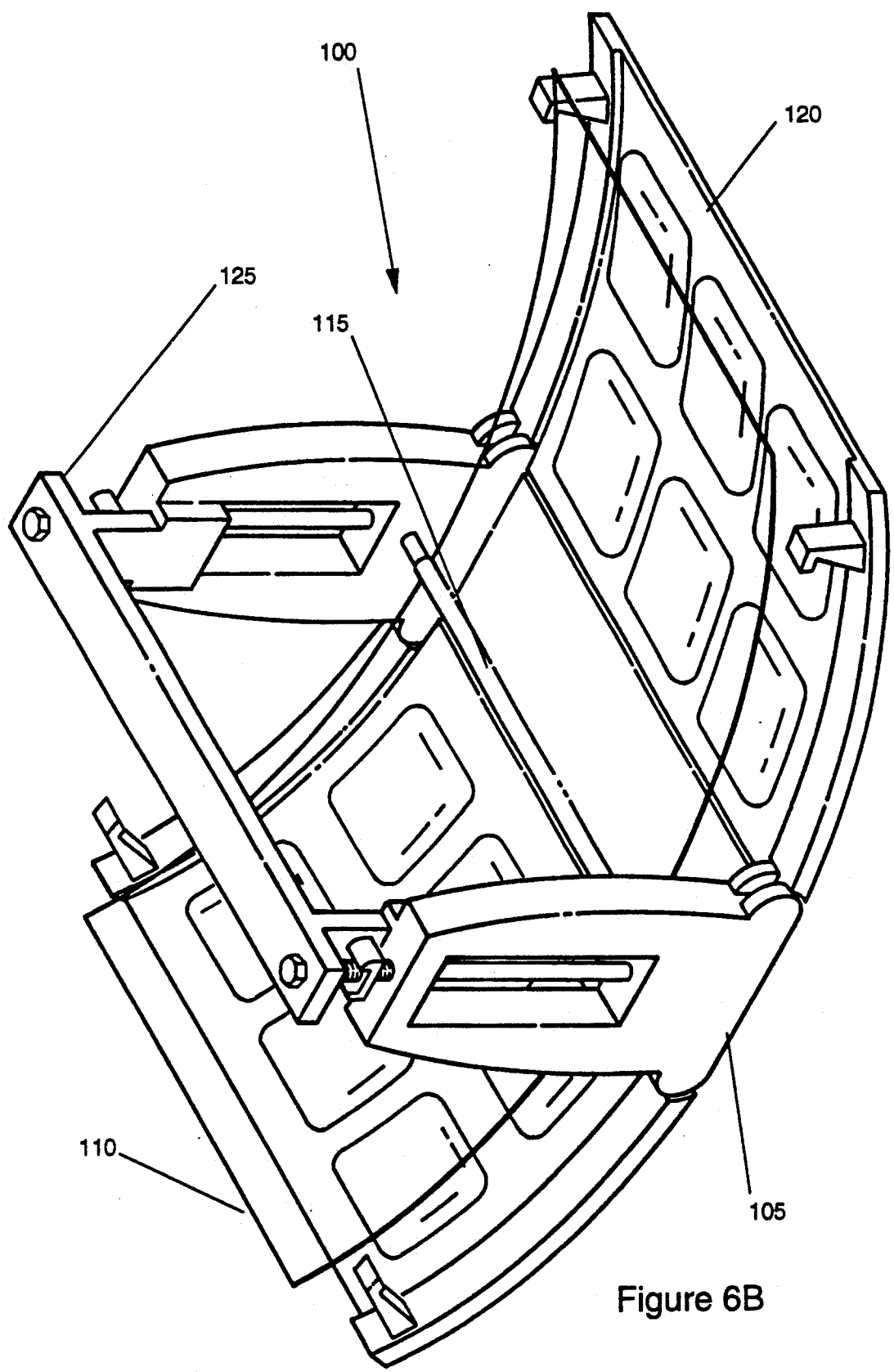
FIG. 6B is a pictorial representation of a first embodiment of the present invention as a parabolic antenna using a line feed in the deployed position.
Figure 7:
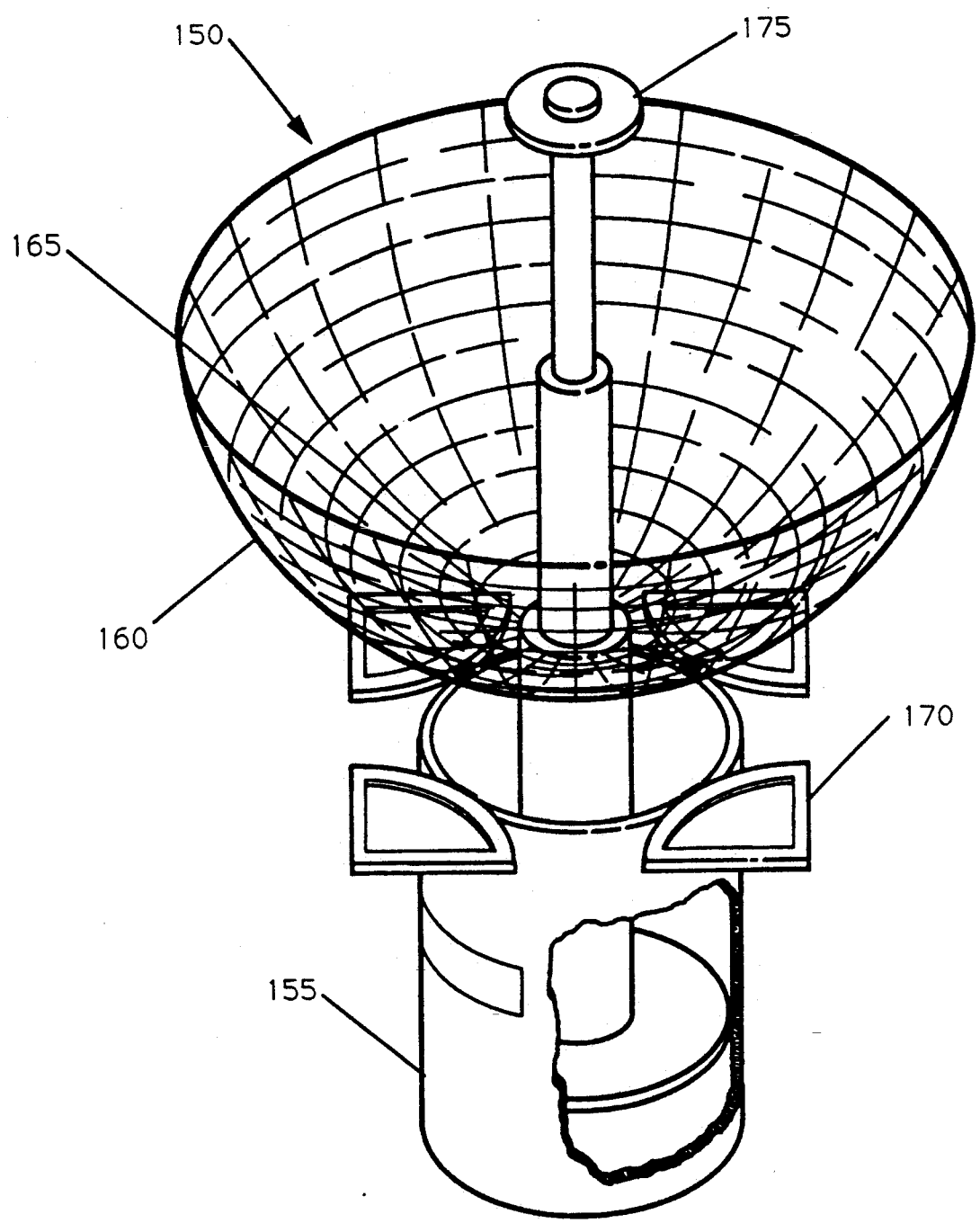
FIG. 7 is a pictorial representation of an alternative embodiment of the present invention as a parabaloidal antenna using a central feed.

FIGS. 6 and 7 are pictorial representations of the present invention as utilized in antennas suitable for use in satellites or spacecraft. FIGS. 6A and 6B illustrate a parabolic antenna 100 having a reflector according to the present invention. FIG. 6A illustrates the antenna in the retracted position and FIG. 6B illustrates the antenna in the deployed position. The antenna 100 has a housing 105 in which the reflector is stowed. The housing 105 protects the antenna from environmental hazards while not in use. The housing has doors 120 which open by mechanical means. When open, the doors 120 operate as back-plates to shape the reflector. The reflector 110 is an electrically conductive flexible membrane as described herein. The membrane is electrostatically stiffened by application of a voltage through the electrical interface 115 which also acts as a restraint in the form of a collection of restraining points to make up a line. The membrane is then shaped by application of voltages to the doors 120 which act as an external element to shape the membrane. The doors may be closed to enclose the reflector 110 into the housing 105 by application of an appropriate charge on the doors 120 to produce an attractive force on the membrane or simply by closing the doors by mechanical means. A retractable feed or receiver 125 is placed at the focal line of the reflector for providing or receiving electrical signals from the reflector. In addition to the above a sensor (not shown) and charge control circuitry (not shown) would be utilized to monitor and control the shape of the antenna and to focus and direct the reflector.

FIG. 7 is a parabaloidal antenna 150 according to the present invention. The antenna 150 has a housing 155 in which the reflector 160 and the retractable feed/receiver 175 are stowed. The housing 155 protects the antenna from environmental hazards while not in use. The housing has doors 170 which open by mechanical means. When open the doors 170 operate as back-plates to shape the reflector. The reflector 160 is an electrically conductive flexible membrane as described herein. The membrane is electrostatically stiffened by application of a voltage through the electrically conductive contact point 165 which also acts to restrain the movement of the reflector 160 to within the effective electrostatic area of the doors 170 operating as back-plates. The membrane is then shaped by application of voltages to the doors 170 which act as a back-plate to shape the membrane. The reflector 160 may be retracted into the housing 155 by application of an appropriate charge on the doors 170 to produce an attractive force on the membrane. A retractable feed/receiver 175 is placed at the focal point of the reflector for providing or receiving electrical signals from the reflector. In addition to the above a sensor (not shown) and charge control circuitry (not shown) would be utilized to monitor and control the shape of the antenna and to focus and direct the reflector.

Suitable materials from which an electrostatically shaped membrane may be made include polyester films, metal foil, polyethylene, composites such as carbon-fiber-backed Polyester film and a carbon matrix. The membrane may be divided into a plurality of electrically conductive sections by selective application of a conductive film or by selective weaving of conductive threads or other means known to one of skill in this art. However any electrically conductive membrane which is susceptible to electrostatically stiffening i.e. supports the development of sufficient electrostatic forces to overcome mechanical stiffness of the membrane, may be used. Any electrically conductive material may be used as a back-plate however, low weight materials are preferred. Any electrically conductive filament may be used as a tether to provide electrical contact to the membrane or a section of the membrane.

The foregoing discussion is illustrative of the present invention, and is not to be construed as limiting thereof. The invention is defined by the following claims, with equivalents of the claims to be included therein.

That which is claimed is:

1. An electrostatically shaped membrane comprising:
   an electrically conductive thin membrane wherein the periphery of said membrane is free to move in at least one direction;
   first charge means for producing an electrical charge on said electrically conductive thin membrane to electrostatically stiffen said membrane,
   second charge means for producing a second electrical charge which shapes said electrostatically stiffened thin membrane; and
   restraint means operably associated with said second charge means and said thin membrane for limiting the movement of at least one point of said thin membrane relative to said second charge means.

2. The electrostatically shaped membrane of claim 1, further comprising:
   sensor means operably associated with said membrane for detecting the shape of said membrane; and
   control means operably associated with said sensor means and said first and second charge means for selectively controlling said first and second charge means to shape said membrane to produce a preselected performance characteristic in said thin membrane.

3. The electrostatically shaped membrane of claim 1 wherein said second charge means comprises an electrically charged back-plate in association with said thin membrane.

4. The electrostatically shaped membrane of claim 1 wherein said electrically conductive thin membrane is divided into a plurality of electrically isolated sections.

5. The electrostatically shaped membrane of claim 4 wherein said second charge means and said restraint means comprises an electrically conductive external element associated with each of said plurality of electrically isolated sections.

6. The electrostatically shaped membrane of claim 1 Wherein said membrane is an antenna.

7. The electrostatically shaped membrane of claim 5 further comprising means for deploying said antenna.

8. The electrostatically shaped membrane of claim 5 wherein said second charge means controls the targeting and rapid scanning of said antenna.

9. The electrostatically shaped membrane of claim 5 wherein said second charge means controls the focal length of said antenna.

10. The electrostatically shaped membrane of claim 5 wherein said second charge means controls the swath of said antenna.

11. An electrostatically shaped satellite antenna comprising:
    an electrically conductive thin membrane wherein the periphery of said membrane is free to move in at least one direction;
    first charge means for producing an electrical charge on said electrically conductive thin membrane to electrostatically stiffen said membrane;
    second charge means for producing a second electrical charge which shapes said electrostatically stiffened thin membrane;
    restraint means operably associated with said second charge means and said thin membrane for limiting the movement of at least one point of said thin membrane relative to said second charge means;
    sensor means operably associated with said membrane for sensing the shape of said membrane;
    control means operably associated with said sensor means for selectively controlling said first and second charge means to shape said membrane to produce a preselected performance characteristic in said thin membrane; and
    deployment means for deploying and retracting said thin membrane.

12. The electrostatically shaped antenna of claim 11 wherein said second charge means comprises an electrically charged back-plate in association with said thin membrane.

13. The electrostatically shaped antenna of claim 11 wherein said electrically conductive thin membrane is divided into a plurality of electrically isolated sections.

14. The electrostatically shaped membrane of claim 13 wherein said second charge means and said restraint means comprises an electrically conductive external element associated with each of said plurality of electrically isolated sections.

15. The electrostatically shaped antenna of claim 11 wherein said first and second charge means targets and rapidly scans said membrane.

16. The electrostatically shaped antenna of claim 11 wherein said first and second charge means controls the swath of said membrane.

17. The electrostatically shaped antenna of claim 11 wherein said first and second charge means controls the focal length of said membrane.

18. A method of electrostatically shaping a thin conductive membrane the periphery of which is free to move in at least one direction, comprising:
    placing a first electrical charge on said thin membrane so as to electrostatically stiffen said membrane;
    sensing the shape of said stiffened membrane;
    positioning a second, external charge relative to said stiffened membrane to shape said membrane; and
    selectively controlling the first and second electrical charge such that the sensed shape of said membrane approximates a preselected performance characteristic of said membrane.

19. The method of claim 18 further comprising the step of varying the polarity of said external charge to retract and deploy said thin membrane.

20. The method of claim 18 wherein said sensing step comprises sensing the performance characteristics of said membrane.

* * * * *